(12) United States Patent
Saegusa et al.

(10) Patent No.: US 9,841,739 B2
(45) Date of Patent: Dec. 12, 2017

(54) MOTION CONTROLLER DEVICE AND COMMUNICATION METHOD THEREIN

(75) Inventors: Takashi Saegusa, Tokyo (JP); Masahiro Koyama, Tokyo (JP); Terunobu Funatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 14/401,542

(22) PCT Filed: Jun. 7, 2012

(86) PCT No.: PCT/JP2012/064653
§ 371 (c)(1),
(2), (4) Date: Dec. 9, 2014

(87) PCT Pub. No.: WO2013/183140
PCT Pub. Date: Dec. 12, 2013

(65) Prior Publication Data
US 2015/0168929 A1    Jun. 18, 2015

(51) Int. Cl.
*G06F 12/00* (2006.01)
*G06F 3/00* (2006.01)
(Continued)

(52) U.S. Cl.
CPC .......... *G05B 15/02* (2013.01); *G05B 19/414* (2013.01); *H04L 67/10* (2013.01); *G05B 2219/33136* (2013.01); *G05B 2219/34208* (2013.01)

(58) Field of Classification Search
CPC .... G05B 15/02; G05B 19/414; G05B 15/414; H04L 67/10; H04L 12/18; H04L 12/42;
(Continued)

(56) References Cited

U.S. PATENT DOCUMENTS 7,580,950 B2 *  8/2009  Kavuri ................. G06F 3/0605
7,801,120 B2 *  9/2010  Steinmetz ............ G06F 3/0613
                                                              370/360
(Continued)

FOREIGN PATENT DOCUMENTS

JP   2005-122592 A    5/2005
JP   2010-273257 A   12/2010
JP   2011-166581 A    8/2011

OTHER PUBLICATIONS

Mesnier et al., Differentiated storage services, Jan. 2011, 9 pages.*
(Continued)

*Primary Examiner* — Thuy Dao
(74) *Attorney, Agent, or Firm* — Mattingly & Malur, PC

(57) ABSTRACT

A motion controller device and a communication method for the motion controller device are provided to reduce the large number of man-hours that are required for making communication settings and wiring design in large-scale systems. The motion controller device and communication method improve the degree of freedom for communication line connections by switching the two transmission paths on the transmitting and receiving sides of the communication ports contained within a central communication device and a terminal communication devices for full duplex communications. The motion controller device and communication also ensure the response performance required in the devices being controlled by way of the terminal communication device that autonomously and dynamically switches the communication paths according to the volume of communication data on the communication line along this type of network.

7 Claims, 10 Drawing Sheets

(51) Int. Cl.
*G06K 7/10* (2006.01)
*G05B 15/02* (2006.01)
*G05B 19/414* (2006.01)
*H04L 29/08* (2006.01)

(58) Field of Classification Search
CPC . H04L 12/46; H04L 12/4625; H04L 67/1097; G06F 3/0689; G06F 3/0607; G06F 3/0661
See application file for complete search history.

(56) References Cited

U.S. PATENT DOCUMENTS

| | | | |
|---|---|---|---|
| 8,180,931 B2* | 5/2012 | Lee | G06F 3/0613 710/14 |
| 8,218,538 B1* | 7/2012 | Chidambaram | H04L 47/6205 370/386 |
| 8,321,650 B2* | 11/2012 | Steinmetz | G06F 13/4234 711/112 |
| 9,201,778 B2* | 12/2015 | Northcutt | G06F 3/0605 |
| 2008/0228987 A1* | 9/2008 | Yagi | G06F 3/0614 710/316 |
| 2009/0144466 A1* | 6/2009 | Takayama | G06F 3/0607 710/38 |
| 2010/0021160 A1* | 1/2010 | Wakayama | H04Q 11/0067 398/45 |
| 2010/0299415 A1 | 11/2010 | Saegusa et al. | |
| 2010/0312943 A1* | 12/2010 | Uehara | G06F 13/387 710/316 |

OTHER PUBLICATIONS

Oguchi et al., Performance improvement of iSCSI remote storage access, Jan. 2010, 7 pages.*

* cited by examiner

FIG.3
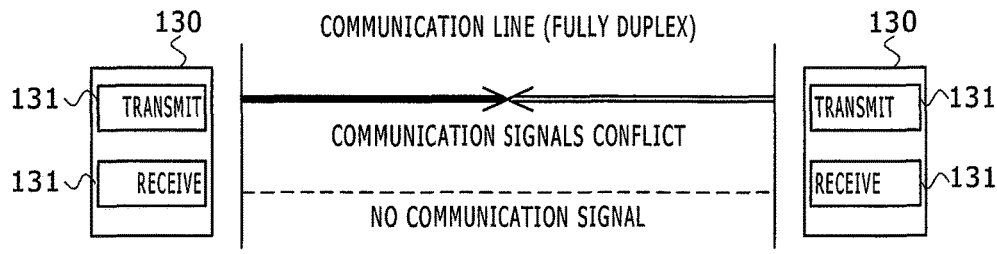
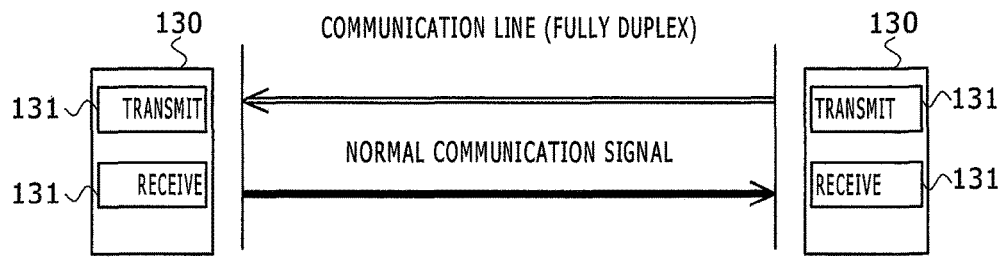
FIG.4
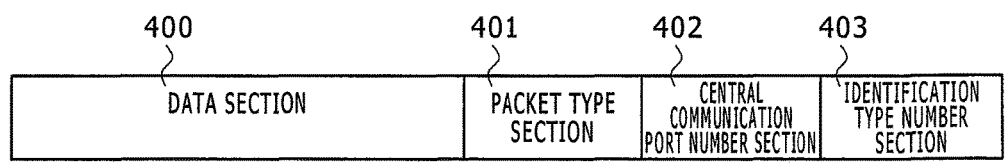

| | COMMUNICATION COST | | | | |
|---|---|---|---|---|---|
| PORT NUMBER (TERMINAL) | 1 | 2 | 3 | 4 | 5 |
| PORT NUMBER (CENTRAL): 1 | 30000 | 30000 | 30000 | 0 | ... |
| PORT NUMBER (CENTRAL): 2 | 0 | 0 | 0 | 0 | ... |
| | 0 | 0 | 0 | 0 | ... |
| | 0 | 0 | 0 | 0 | ... |
| | : | : | : | : | |

(b)

| | COMMUNICATION COST | PORT NUMBER |
|---|---|---|
| 1 | 1 | 1 |
| 0 | 1 | 2 |
| 0 | 2 | 2 |
| 0 | 4 | 3 |
| : | : | : |

MOTION CONTROLLER DEVICE AND COMMUNICATION METHOD THEREIN

TECHNICAL FIELD

The present invention relates for example to an motion controller device that controls a device-for-control coupled by way of a network built into industrial equipment, and to a communication method for information in that same device.

BACKGROUND ART

In recent years, control systems are being employed that couple various types of control devices over a network with the aim of minimizing the wiring factory automation (FA) systems. In industrial equipment in particular, a so-called motion controller is utilized for devices for control, by coupling the drivers to drive motors on each axis within the drive system and the input and output devices contained within the peripheral devices by way of a network.

The motion controller device is comprised of a central communication device that controls the entire controller, and plural terminal communication devices that directly drive devices for control such as sensors and actuators; and that is utilized by configuring a network in which the communication lines couple the central communication device and plural terminal communication devices by way of configurations such as multi-drop and daisy chains.

The motion controller device executes control by way of a central communication device and terminal communication device that transmit and receive control information for devices and sensor input information via the network.

The network for this type of motion controller device are often utilized in topologies such as bus or ring type topologies by multi-drop, and these topologies have simple communication control and a simple network configuration.

Currently however, advances in the functions and performance of industrial equipment have led to a greater number of devices for control, and systems are now on a large scale, so that adapting network type controllers utilizing multi-drop to these types of large-scale systems, causes longer communication lines and also complicated controller configurations in systems where the available footprint (surface area) is limited such as in industrial equipment.

To resolve these types of problems network topologies that are configured to allow branch coupling such as by point-to-point topology are considered for use on networks for motion controller devices. However, in view of the restrictions on methods for coupling the communication lines in these types of networks, network topology capable of satisfactory response performance required by each device for control is necessary.

Therefore, a great many man-hours are required when applying motion controller devices utilizing these types of networks to large-scale systems.

Moreover, on these types of networks for motion controller devices, plural communication paths are sometimes configured for one terminal communication device in some cases in order to avoid communication interference. There is for example a technology (Patent Literature 1) for coupling a field bus defined as a single configuration bus and a redundant configuration bus while maintaining the universality of the host (upper-ranking) controller. However, these types of networks not only make the coupling methods for communication lines more complicated and the system structure more complicated, but also require many man-hours for communication settings and adjusting the coupling configuration so as to satisfy the response performance required for each device for control.

CITATION LIST

Patent Literature

Patent Literature 1: Japanese Unexamined Patent Application Publication No. 2005-122592

SUMMARY OF INVENTION

Technical Problem

In view of the aforementioned problems with the systems of the related art, the present invention has the main object of providing a motion controller device for eliminating restrictions on methods for coupling communication lines in communication ports and reducing the number of man-hours required when the controller is applied in network structures capable of branching by way of point-to-point topology; and moreover a communication method for information in the same device(s). Namely, the invention provides a motion controller device capable of ensuring the response performance required for each device for control in a structure comprising a network having plural communication paths for one terminal communication device, by dynamically changing the communication paths according to the volume of communication data along the communication line; and provides a communication method for information in that same device.

Solution to Problem

In order to achieve the above objects, an aspect of the present invention provides a motion controller device comprised of one or more terminal communication devices that execute input or output operation or control processing for devices for control, and a central communication device coupled to the terminal communication devices by utilizing a network; and further including a transmission path between at least one communication port for the central communication device and any one of communication ports of the terminal communication device; and a transmission path between at least one communication port of the terminal communication device and any one of the communication ports of the central communication device, or any one of communication ports of the other terminal communication devices; and a network is configured in this way and a motion controller device is provided so that a terminal communication device is capable of coupling multiple transmission paths.

According to an aspect of the present, invention, in the above-described motion controller device, the central communication device further includes a control software execution unit that executes control commands to the devices for control and/or sets a communication control method; a control information storage unit that stores control commands to the devices for control and/or stores the input and output information; an identification number storage unit that stores identification numbers for recognizing the individual terminal communication device coupled to the network; a central communication control unit that controls communications between the terminal communication devices by way the network; one or more communication ports including one or more communication channels that convey a transmit signal and/or a receive signal by full duplex transmission for a communication signal of the network; and a communication signal transmit and receive unit that is configured from a pair of a communication signal receiver unit that executes receive processing of communication signals of the network and a communication signal transmitter units that execute transmit processing of communication signals of the network which are equal in number to the communication channels of each communication port; and the terminal communication device further includes: an identification number setter unit that sets the identification number; a device control unit that controls the device for control based on control commands that are sent from the central communication device by way of the network or performs operations for input and output information that is transmitted to and is received from the central communication device by way of the network; an upstream port number storage unit that specifies one of its own communication ports to transfer communication data when carrying out communications with the central communication device by way of the network; a terminal communication control unit that controls communication with the central communication device by way of the network; and two or more communication ports, each communication port respectively including two communication signal transmit and receive units as well as a transmit and receive switching control unit that switches performing of and/or stopping of transmitting operation and receiving operation of the communication signal transmit and receive units, for one communication channel of the communication port.

According to an aspect of the present invention, in the above-described motion controller device, the central communication device preferably further includes: a central communication cost storage unit that stores communication costs as information expressing the delay time for communication that is required with the terminal communication devices coupled to the network; a communication path control setting information storage unit that stores communication path control information as information expressing change methods when each terminal communication device changes communication paths on the network; a communication status information storage unit that stores information regarding the communication status of each terminal communication device in the network; a communication path information storage unit that stores communication path information as information expressing the network path to each terminal communication device; and a communication data quantity setting information storage unit that stores communication data quantity setting information as information for setting the limit quantity of communication data on the communication lines set in the terminal communication device, and the terminal communication device further includes: a communication data quantity setting unit that stores the limit quantity of communication data on the communication line coupled to the terminal communication device; and a communication path control information setting unit that sets communication path control information as information expressing change methods when changing communication paths of the network. Moreover, the control software execution unit of the central communication device preferably includes a function to set the communication cycle and the response time that are required in the terminal communication device, and generate communication path control information and communication data quantity setting information based on the communication cycle and the response time that are set, and store that information in the communication path control setting information unit and the communication data quantity setting information storage unit of the central communication device; or the control software execution unit of the central communication device preferably includes a function to search the communication status information storage unit and the communication path information storage unit of the central communication device, and provide the topology, the communication path, and the communication status. Moreover, the control software execution unit of the central communication device preferably installs functions for displaying the network communication status and setting functions within the control software execution unit of the central communication device by way of a GUI (graphical user interface).

Moreover, according to an aspect of the present invention, to achieve the above-described objects, a communication method for the above-described motion controller device is provided in which the terminal communication device switches transmitting operation and receiving operation in the communication signal transmit and receive unit by way of a transmit and receive switching control unit of the communication signal control unit, and sets the transmitting operation or receiving operation in the communication signal transmit and receive unit so that full duplex communication signals are normally conveyed on all the transmission paths, the central communication device transmits communication data including communication port numbers as unique numbers set for each communication port from all of its own communication ports, the terminal communication device sets the communication port that initially receives the communication data transmitted from the central communication device as the upstream port among all of the terminal communication device's own ports, and stores the communication port number that is the individual port number set for that communication port as well as the communication port number contained in the communication data that is received at this time in an upstream port number storage unit, the central communication device from there onwards transmits communication data including a communication port number for its own communication port where transmission of communication data is performed and an identification number set in the terminal communication device to the terminal communication device by way of its own communication port, the terminal communication device receives communication data from the central communication device by way of the upstream port specified by the upstream port number storage unit, and the terminal. communication device internally loads the communication data when the identification number of the communication data matches the identification number set inside its own device, when the identification number of the communication data does not match the identification number set inside its own device, the communication data is transmitted from any other communication port; and when the communication port number of the central communication device that is contained in the communication data that is received from those other communication ports matches the communication port number of central communication device stored in the upstream port number storage unit, that communication data is transmitted from the upstream communication port, when there is no match, that communication data is discarded, and when the terminal communication device transmits communication data from itself to the central communication device, the communication data including the communication port number of the central communication device stored in the upstream port number storage unit and the identification number set inside the device itself is transmitted to the central communication device by way of the upstream port.

Also in the present invention, a communication method for the above-described motion controller device is provided in which the central communication device further includes: a central communication cost storage unit that stores communication costs as information expressing the delay time for communication that is required with the terminal communication device coupled to the network; a communication path control setting information storage unit that stores communication path control information as information expressing change methods when each terminal communication device changes communication paths on the network; a communication status information storage unit that stores information regarding the communication status of each terminal communication device on the network; a communication path information storage unit that stores communication path information as information expressing the network path to each terminal communication device; and a communication data quantity setting information storage unit that stores communication data quantity setting information as information for setting the limit quantity of communication data on the communication lines set in the terminal communication device; and the terminal communication device further includes: a communication data quantity storage unit that stores the limit quantity of communication data on the communication line coupled to the terminal communication device; and a communication path control information setting unit that sets communication path control information as information expressing change methods when changing communication paths over the network, the central communication device stores communication path control information and communication data quantity setting information that are set in each terminal communication device into the communication path control setting information storage unit and the communication data quantity setting information storage unit by way of the control software execution unit, the central communication control unit transmits the communication path control information stored in the communication path control setting information storage unit and communication data setting information stored in the communication data quantity setting information storage unit by way of the network, the terminal communication device stores the communication path control information that is transmitted from the central communication device into the communication path control information storage unit, and further stores the communication data quantity setting information that is transmitted from the central communication device into the communication data quantity storage unit, and the terminal communication device constantly monitors the communication data quantity of the upstream port that is specified by the upstream port number storage unit, and when the communication data quantity exceeds the value that is stored in the communication data quantity storage unit, executes any of the following communication control from the terminal communication control unit based on the communication path control information stored in the communication path control storage unit so that: the communication data quantity is transmitted from one of its own ports other than the upstream port, to a communication port of the central communication device other than the communication port of the central communication device specified by the upstream port number storage unit; the communication data quantity or the communication data quantity is transmitted from a communication port other than the upstream communication port to a communication port of the central communication device specified by the upstream port number storage unit; or is transmitted from an upstream control port.

Advantageous Effects of Invention

A main feature of the present invention is that the number of man-hours required when adapting the controller can be reduced and there is no need to consider methods for coupling communication ports when configuring a network. Moreover, a complex network such as having plural communication paths can be easily configured without the necessity for considering methods for coupling communication ports when configuring the network.

BRIEF DESCRIPTION OF DRAWINGS

FIG. 3 is a drawing showing an example of the communication status during execution of processing for establishing communication for each communication line in the present invention.

FIG. 4 is a drawing for describing the format of the packet that is utilized in network communication in the present invention.

FIG. 7 is a drawing showing one example of the structure of the terminal communication cost storage unit in the present invention.

DESCRIPTION OF EMBODIMENTS

Figure 1:
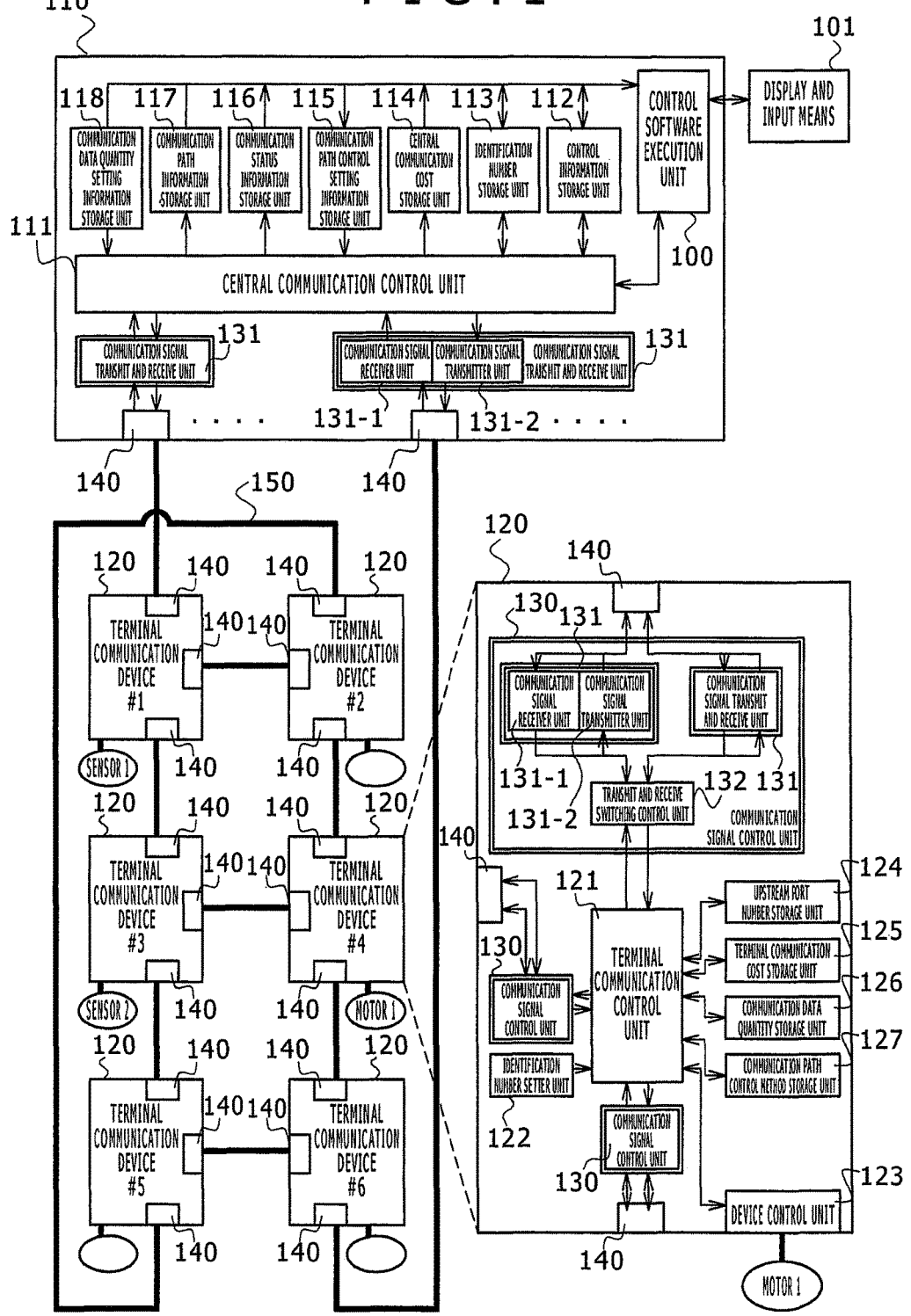
FIG. 1 is a drawing showing the structure of the motion controller of an embodiment of the present invention.

The embodiment of the present invention is hereafter described while referring to an example that is shown in FIG. 1.

FIG. 1 is a structural drawing of the motion controller of an embodiment of the present invention. A detailed structure of just one of plural terminal communication devices 120 as a representative example is shown by a broken line and enlarged.

As can be clearly seen in the drawing, the motion controller of the embodiment is a control system comprised of a central communication device 110, one or more terminal communication devices 120, and a network to couple these components, and the devices for control (such as sensors and motors, etc.) are respectively coupled to and are controlled by these terminal communication devices 120.

The central communication device 110 is comprised of a control software execution unit 100 that executes control commands to the device for control and sets communication control methods; a control information storage unit 112 that stores control command to the device for control and input-output information; an identification number storage unit 113 that stores the identification number to uniquely recognize a terminal communication device 120 coupled to the network; a communication central communication cost storage unit 114 that stores communication costs as information expressing the delay time required for communication with each terminal communication unit 120 coupled to a network; a communication path control setting information storage unit 115 that stores communication path control information as information expressing change methods when each terminal communication unit 120 is changing communication paths on a network; a communication status information storage unit 116 that stores information regarding the communication status on the network for each terminal communication unit 120; a communication path information storage unit 117 that stores communication path information as information expressing the network path to each terminal communication unit 120; a communication data quantity setting information storage unit 118 that stores communication data quantity setting information as information for setting the limit quantity of communication data on the communication lines set in each of the terminal communication units 120; a central communication control unit 111 that controls communications with the terminal communication units 120 over a network; and one or more communication ports 140 containing one or more communication channels to carry out full duplex transmission of transmit signals and receive signal for communication signals in the network. Each of the communication ports respectively includes a communication signal transmit and receive unit 131 that is comprised, of a pair of a communication signal receiver unit 131-1 that executes receive-processing of communication signals of the network, and a communication signal transmitter unit 131-2 that executes transmit-processing of communication signals of the network, and that are equal in number to the communication channels of the communication port. As can be clearly understood from the drawing, each communication signal receiver unit 131, shown as a representative unit in the drawing, respectively includes a communication signal receiver unit 131-1 and a communication signal transmitter unit 131-2.

The terminal communication device 120 is comprised of an identification number setter unit 122 that sets its own identification No., a device control unit 123 that controls the device for control based on control commands that are transmitted from the central communication unit 110 by way of the network; an upstream port number specifying unit 124 that specifies a communication port 141 for carrying out data transfer during communication with the central communication unit 110 over a network; a terminal communication cost storage unit 125 that stores the communication cost as information expressing the delay time that is required for communication with the central communication unit 110 over a network; a communication data quantity storage unit 126 that stores the communication data quantity of the communication line 150 coupled to the terminal communication unit 120; a communication path control method storage unit 127 that sets the communication path control information as information expressing the change method during a change in communication paths over the network; a terminal communication control unit 121 that controls communication with the central communication unit 110 by way of the network; one or more communication ports 140; and a communication control unit 130. This communication control unit 130 shown as a representative unit in the drawing, is comprised of two communication signal transmit and receive units 131, 131 for one communication channel of each communication port 140, and a transmit and receive switching control unit 132 that performs transmitting and receiving and/or stops the switching of these communication signal transmit and receive units. Each of the communication signal transmit and receive units 131 includes a communication signal receiver unit 131-1 and a communication signal transmitter unit 131-1 the same as is described above.

A communication line 150 is coupled between at least one communication port of the central communication device 110, and any one of the communication ports 140 of the plural terminal communication devices 120. A communication port 150 is also coupled between at least one communication port 140 of the terminal communication device 120, and any one of the communication ports 140 of the central communication device 110; or any one of communication port 140 of the other terminal communication devices 120 in this way a network is configured. A communication port number serving as a unique number is assigned to the respective communication ports 140 of the central communication device 110 and the terminal communication device 120.

The operation of the central communication device 110 and the terminal communication device 120 is described next according to the sequence when the motion controller that is shown in FIG. 1 is actually establishing a network.

First of all, in the figure, a communication line 150 couples the communication port 140 of the central communication device 110, and the communication port 140 of the terminal communication device 120. Communication via each of the communication lines 150 is established by determining the transmit channel and receive channel so that a full duplex communication signal is correctly transmitted between two communication ports per the communication port 140 of the terminal communication device 120. The communication signal transmit and receive units 131 of the communication signal control unit 130 coupled to the communication port 140 of the terminal communication device 120 at this time is capable of transmitting a communication signal by performing transmitting operation and stopping receiving operation, and also is capable of receiving a communication signal by stopping transmitting operation and performing receiving operation by way of the control of the transmit and receive switching control unit 132 so that establishing communications is achievable by switching between the transmitting and receiving functions of the plural communication signal transmit and receive units 131 that are contained within the communication signal control unit 130 of the terminal communication device 120.

Figure 2:
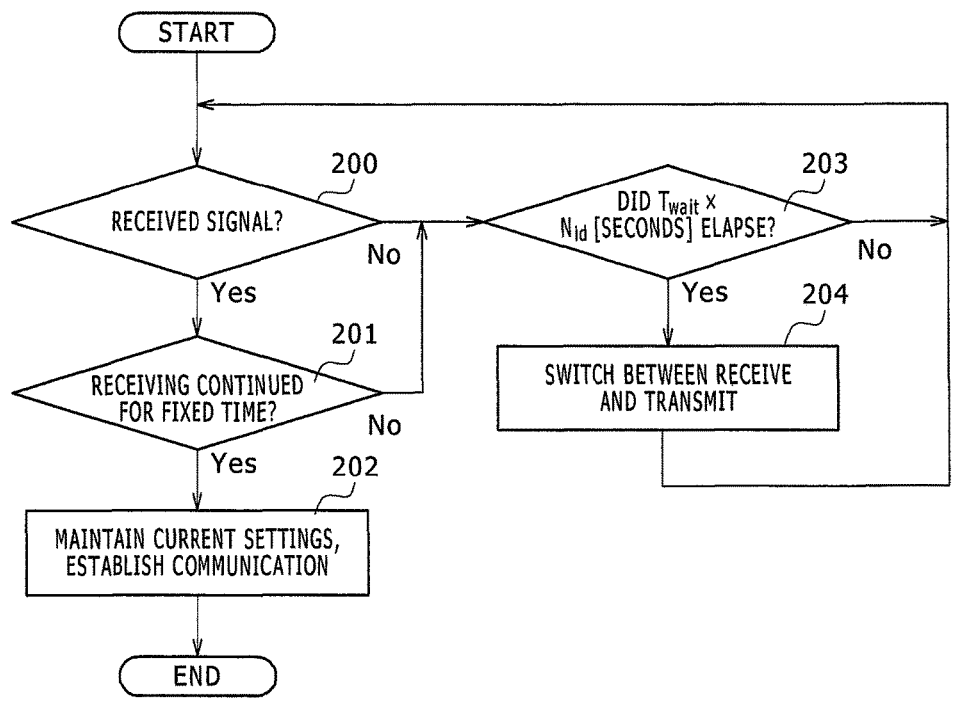
FIG. 2 is a drawing for describing the processing sequence of the communication signal control unit for establishing communication for each communication line in the present invention.

FIG. 2 is a flow chart for showing the process that is performed by the communication signal control unit 130 for establishing communication in each communication line 150 in the motion controller described above in FIG. 1. The identification number for the terminal communication device 120 is set beforehand by the identification number setter unit 122. One among the two communication signal transmit and receive units 131, 131 within the communication signal control unit 130 of the terminal communication device 120 performs transmitting of a communication signal and the other performs receiving of a communication-signal.

Moreover, the mutual standby (wait) time in the terminal communication device 120 is set to $T_{wait}$ [seconds], and the identification number set in terminal communication device 120 is set to $N_{id}$.

The communication signal control unit 130 of the terminal communication device 120 first of all decides whether or not a communication signal transmit and receive unit 131 executing the receiving operation among the two above-described communication signal transmit and receive units 131, 131 is actually receiving a communication signal (process 200). When actually receiving a communication signal ("Yes" in the figure), the communication signal control unit 130 further decides whether or not the communication signal transmit and receive unit 131 executing the receiving operation is able to maintain the receive status for a specified time (process 201).

If results from the decision process 201 are that receive status is continued for a specified time (for example: approximately $T_{wait}/8$ [s] to $T_{wait}/4$ [s]) ("Yes" in the figure), then maintaining the receiving and transmitting functions assigned to the two communication signal transmit and receive units 131 at this time establishes communication over the communication line 150 coupled to the communication port 140 within this communication signal control unit 130 (process 202) and the process ends.

On the other hand, if the results from the above process 200 are that the communication signal transmit and receive unit 131 is not receiving a communication signal ("No" in the figure), or if the results from process 201 are that receive status did not continue for a specified time ("No" in the figure), a decision is made by way of $T_{wait} \times N_{id}$ [seconds] cycle timer on whether $T_{wait} \times N_{id}$ [seconds] elapsed or not (process 203) If results from the process 203 are that $T_{wait} \times N_{id}$ [seconds] elapsed ("Yes" in the figure), the switching between receiving and transmitting is executed among the two communication signal transmit and receive units 131, 131 of the communication signal transmit and receive unit 130.

On the other hand, if results from the process 203 are that $T_{wait} \times N_{id}$ [seconds] has not elapsed ("No" in the figure), the operation of the two communication signal transmit and receive units 131, 131 of the communication signal transmit and receive unit 130 is left unchanged and the process 200 is executed again.

Next, FIG. 3 shows one example of the communication status of the communication line 150 when executing the processing of the communication signal control unit 130 for establishing communication via the communication line 150 that is shown in the above FIG. 2.

Namely, in the example in FIG. 3, at time n [seconds], the communication channel settings are mutually transmitting and mutually receiving in the two terminal communication devices 120, 120 so that the communication signals in the communication line are in a conflicting signal and no-signal state so that communication cannot be established.

On the other hand, at time n+($T_{wait}$) [seconds], the setting for one communication channel of the terminal communication devices 120, 120 are switched so that there is a combination of transmitting and receiving, receiving and transmitting along each communication channel in the two terminal communication devices 120, 120 and therefore a full duplex correct communication signal can be transmitted along the communication line and so communication can be established.

The communication data format utilized by the central communication device 110 and the terminal communication device 120 when mutually communicating over a network is described next.

FIG. 4 shows the communication data format or namely the so-called packet that is utilized when the central communication device 110 and the terminal communication device 120 are carrying out communications via the network of the motion controller in FIG. 1.

As can be clearly understood from the drawing, the packet is comprised of a data section 400 that stores data for carrying out the actual communication such as control commands and input-output information; a packet type section 401 that stores information expressing the type of packet; a central communication port number section 402 that stores the communication port number of the central communication device 110 of the communication destination and the communication source; and an identification (type) number section 403 that stores the identification number of the terminal communication device 120 for the communication destination and the communication source.

A packet transmitted from the central communication device 110 and that is utilized for establishing communication functions over the network is the so-called communication initialization setting packet. In the communication initialization setting packet, a unique number of the packet is stored in the packet type section 401, a port number for the communication port 140 for carrying out transmitting from the central communication device 110 is stored in the central communication port number section 402, however nothing is stored in the other sections.

The packet transmitted from the central communication device 110 and that is utilized for transferring control information and input-output information, to the device for control coupled to the terminal communication device 120 is the control information packet. Within the control information packet, control information or input-output information is stored in the data section 400, a unique number for the packet is stored in the packet type section 401, a port number for the communication port 140 that performs transmission from the central communication device 110 is stored in the central communication port number section 402, and the identification number set in the terminal communication device 120 is stored in the identification number section 403.

Further, the packet transmitted from the terminal communication device 120 and that is utilized for transferring communication status and error information of the terminal communication device 120 is the terminal information packet. Within the terminal information packet, the error information and communication status of the terminal communication device 120 is stored in the data section 400, the unique identification number for this packet is stored in the packet type section 401, the port number for the communication port 140 of the central communication device 110 serving as the transmitting destination is stored in the central communication port number section 402, and the identification number set in the terminal communication device 120 is stored in the identification type number section 403.

The operation when the central communication device 110 and terminal communication device 120 establish a communication function by way of a network is described next.

After communication is established for all communication lines 150, the central communication device 110 transmits the above-described communication initialization setting packet from all of its own communication ports 140.

Figure 5:
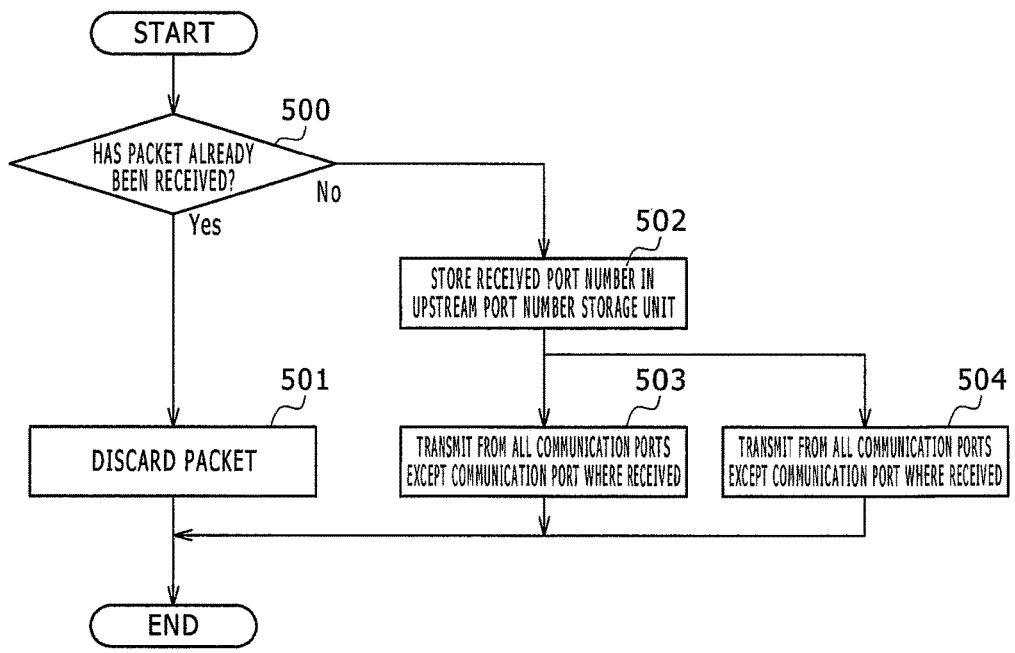
FIG. 5 is a drawing for describing the processing sequence of the terminal communication control unit for establishing the communication functions for the network in the present invention.

FIG. 5 is a flow chart showing the process that is executed by the terminal communication control unit 121 for establishing a communication function over the network in the motion controller of FIG. 1.

When the communication initialization setting packet is received from any of the plural communication ports 140, the terminal communication device 120 decides whether there are already previously received communication initialization setting packets from any of the plural communication ports 140, 140, . . . (process 500). When there are already previously received communication initialization setting packets from the past ("Yes" in the figure), the (just) received communication initialization setting packet is discarded (process 500) and the process ends.

On the other hand, when the results from the above process 500 are that communication initialization setting packets have not been received in the past ("No" in the figure), the port number (No.) where the packet is received is stored in the upstream communication port number storage unit 124 (process 502). The received communication initialization setting packet is then transmitted from all of the communication ports 140 except the communication port 140 that received the communication initialization setting packet (process 503).

A terminal information packet is transmitted at the same time from the communication port 140 where the communication initialization setting packet is received, and from then onwards a terminal information packet is periodically transmitted (process 504).

Figure 6:
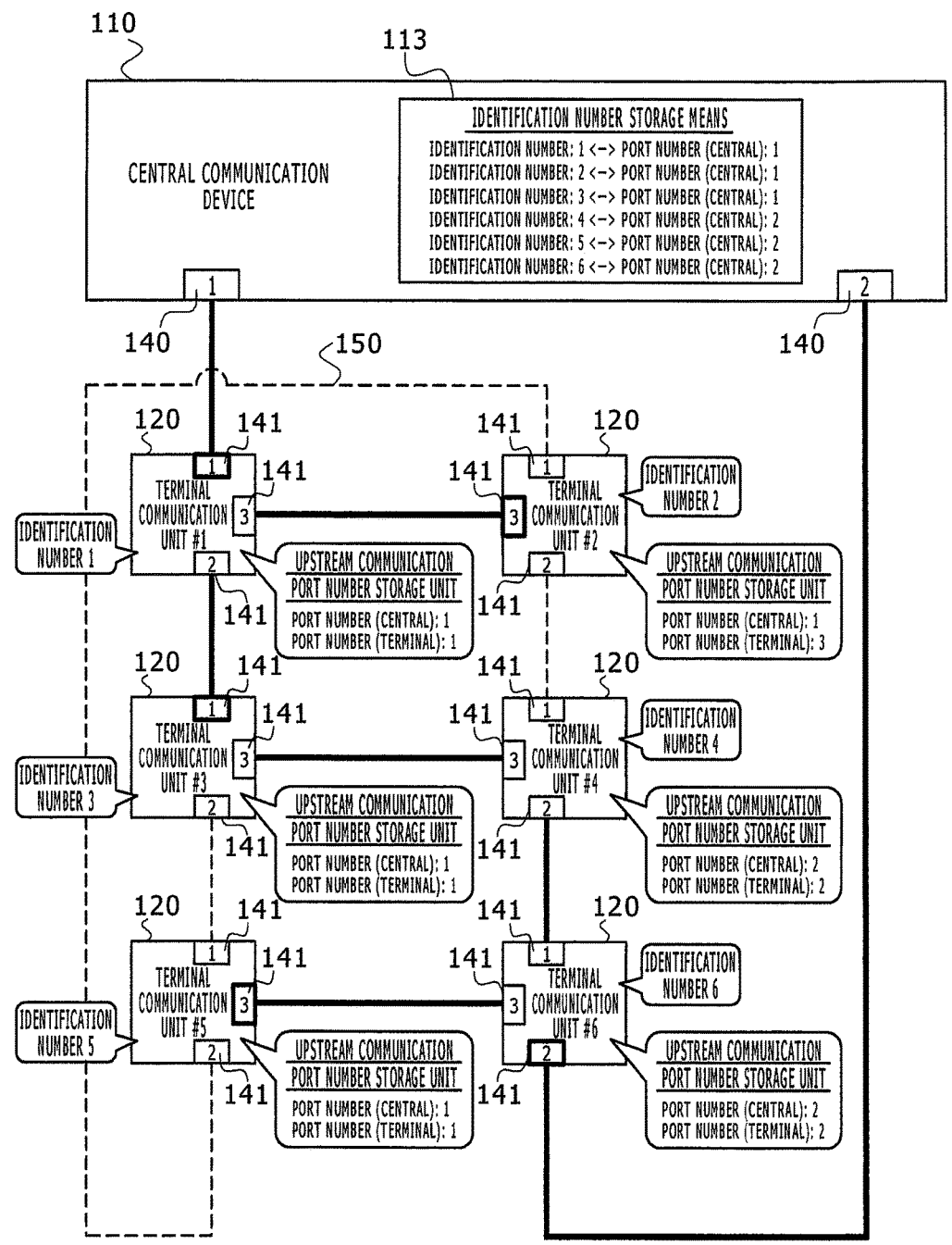
FIG. 6 is a drawing for describing the results during execution of processing for establishing a communication function for the network in the present invention.

FIG. 6 is a drawing showing the results from the processing performed by the terminal communication control unit 121 shown in FIG. 5 for the motion controller of FIG. 1. In the drawing, the numbers within the communication port 140 of the central communication device 110 and the terminal communication device 120 indicate the port numbers that are set in each communication port 141.

When the central communication device 110 transmits a communication initialization setting packet from all of its own communication ports 140 after communications are established for all communication lines 150, the content shown in FIG. 6 is stored in the upstream communication port number storage unit 124 for each terminal communication device 120.

When the setting is made in the upstream communication port number storage unit 124, the terminal communication device 120 from then onwards transmits the packet from all of the communication ports 140 except the upstream communication port in the case where a packet other than the communication initialization setting packet is received from a communication port 140 (hereafter, "upstream communication port") specified by the upstream communication port number storage unit 124.

In the case where a packet other than the above-described communication initialization setting packet is received from a communication port 140 other than the upstream communication port, a search for a central communication port number section 402 for the packet is made, and when the result is that there is a match with the port number for the central communication device 110 stored in the upstream communication port storage unit 124, the packet is transmitted to the upstream communication port, and if not a match the packet is discarded.

Further, when transmitting packets from itself, the terminal communication device 120 stores its own identification number, and the port number of the central communication device 110 stored in the upstream communication port storage unit 124, into the packet, and transmits it from the upstream port.

In other words, communication control of the target terminal communication device 120 allows the central communication device 110 to receive the terminal information packet that is transmitted from each terminal communication device 120. The identification number of the identification type number section 403 for the terminal information packet, and the port number of the communication port 140 of the central communication device 110 that did the receiving are then stored in the identification number storage unit 113.

The central communication device 110 then searches the identification number storage unit 113, and transmits the packet to the terminal communication device 120 from the communication port 140 corresponding to the port number stored in the identification number storage unit 113.

In other words, in the above-described communication control, the communication line 150 shown by the thick lines in FIG. 6 forms the path in the network that actually executes communications and attains a so-called tree structure coupling configuration.

In the motion controller where communication over a network is established, the terminal communication device 120 switches the network communication paths according to the communication data quantity of the communication line 150 as described below.

The communication cost (namely, the number of other terminal communication devices 120 that are routed through when carrying out communications from the terminal communication device 120 to the central communication device 110) that is required for switching the network communication paths by the terminal communication device 120 is first of, all calculated.

The packet transmitted from the central communication device 110 and that is utilized for calculating the communication cost along the network communication path coupled to the terminal communication devices 120 is the so-called communication cost calculation packet. In this communication cost calculation packet, the data section 400 stores the communication cost when the initial value is set to "1" and that value is increased each time a transmission from a terminal communication device 120 is received. In the communication cost calculation packet, the packet type section 401 stores a unique number of that packet, the central communication port number section 402 stores the port number of the communication port 140 when the central communication device 110 is transmitting, and the identification number section 403 stores the identification number set in the terminal communication device 120.

FIG. 7 shows one example of the data structure of the terminal communication cost storage unit 117 for storing the communication cost that is required when changing the communication path by operation of the terminal communication device 120 in the motion controller shown in FIG. 1.

FIG. 7(*a*) shows one example of the data structure of the terminal communication cost storage unit 117 for making a correspondence and storing the communication cost or so-called terminal communication cost from all of the communication ports 140 of the central communication device 110 to all of the communication ports 140 of the terminal communication device 120.

FIG. 7(*b*) shows one example of the data structure of the terminal communication cost storage unit 117 when storing the communication cost and the communication port 140 that receives the terminal communication device 120 in the order of small communication cost.

Figure 8:
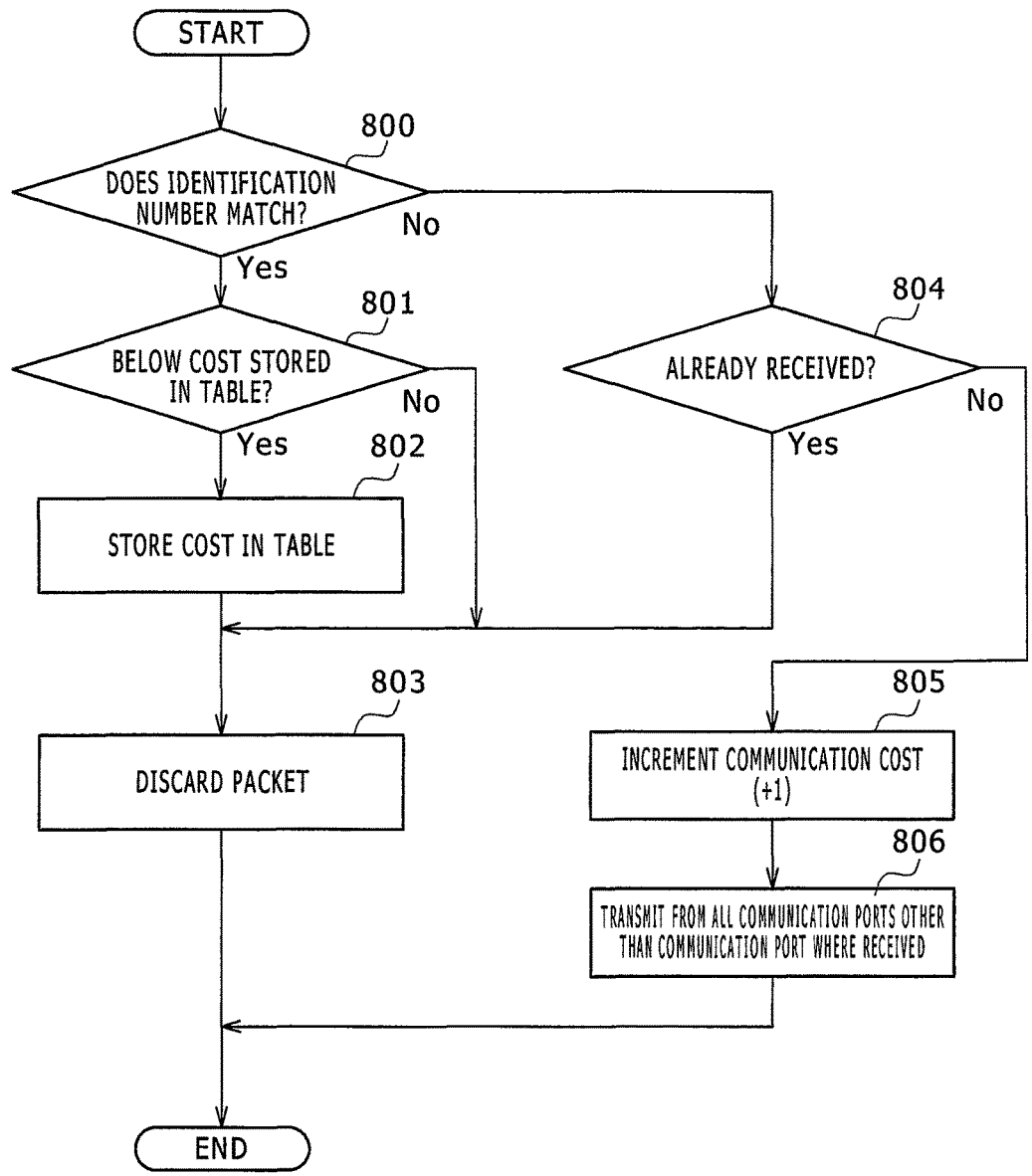
FIG. 8 is a drawing for describing the processing sequence of the terminal communication device for calculating the communication cost in the present invention.

FIG. 8 is a flow chart showing the process in the terminal communication unit 121 for calculating the communication cost required for changing the communication path by the operation of the terminal communication device, in the motion controller of FIG. 1.

First of all, when the communication cost calculation packet is received, the terminal communication device 120 decides whether or not it matches the identification number set within itself (process 800).

When the result from the process 800 is that there is a match for the identification number ("Yes" in the figure), the communication cost stored in the communication cost calculation packet is compared with the communication cost stored in the terminal communication cost storage unit 125 (process 801).

When the result from comparison process 801 is that the communication cost of the communication cost calculation packet that is received is a smaller value than the cost stored in the terminal communication cost storage unit 125 ("Yes" in the figure), the communication cost of that communication cost calculation packet is stored in a location corresponding to the terminal communication cost storage unit 125 (process 802), the received communication cost calculation packet is discarded (process 803), and the process ends.

On the other hand, when the result from the comparison process 800 is that there is no match for the identification number, ("No" in the figure), a decision (process 804) is made on whether or not there is an identical communication cost calculation packet already received from the communication port and if the result is that the communication cost calculation packet is not received ("No" in the figure), the communication cost stored in the data section 400 of the communication cost calculation packet is incremented (+1) (process 805), and the communication cost calculation packet is then transmitted from all of the communication ports other than the port that received the communication cost calculation packet (process 806).

However if the result from process 801 is that the communication cost of the communication cost calculation packet that is received is a value larger than the cost stored in the terminal communication cost storage unit 125 ("No" in the figure), or if the result from process 804 is that an identical communication cost calculation packet is already received ("Yes" in the figure), the received communication cost calculation packet is discarded (process 803).

In the above processing, the communication cost along each communication path is calculated, and is stored in the terminal communication cost storage unit 117 of each terminal communication device 120.

The operation to switch the communication path by the terminal communication device 120 utilizing the above-described communication cost is described next.

Figure 9:
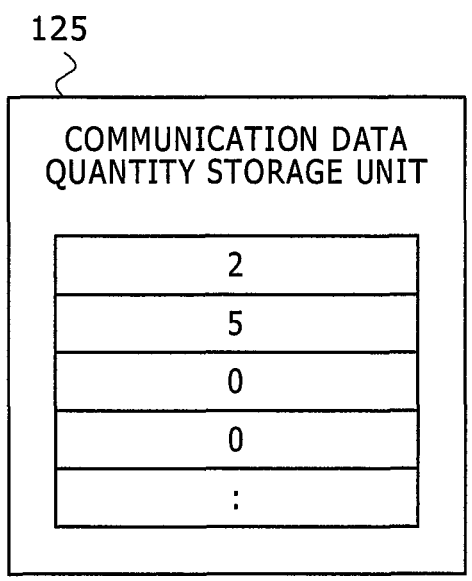
FIG. 9 is a drawing showing one example of the structure of the communication data quantity storage unit in the present invention.

FIG. 9 shows one example of the data structure of the communication data quantity storage unit 125 of the terminal communication device 120 in the motion controller shown in FIG. 1.

In other words, the communication data quantity storage unit 125 stores the communication data quantity for switching communications, and when the number of waiting transmission (standby) communication packets of each communication port 140 confirmed in fixed cycles by the terminal communication control unit 121 corresponding to the communication data quantity stored here is large, the terminal communication device 120 switches the communication path.

The central communication control unit 111 transmits the communication data quantity setting information stored in the communication data quantity setting information storage unit 118 of the central communication device 110 to the terminal communication device 120 so that the value for the communication data quantity is stored into the communication data quantity storage unit 125.

Figure 10:
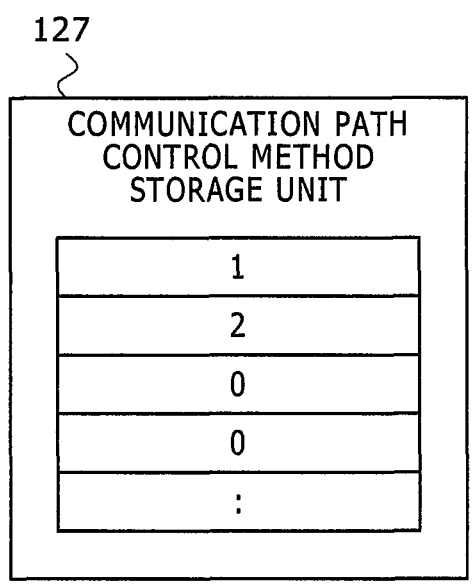
FIG. 10 shows one example of the data structure of the communication path control method storage unit in the terminal communication device of the present invention.

FIG. 10 shows one example of the data structure of the communication path control method storage unit 127 of the terminal communication device 120 in the motion controller shown in above FIG. 1.

In the figure, the communication path control information stored in the communication path control method storage unit 127 is information showing which of the two switching methods to apply when switching the communication path by way of the terminal communication device 120.

The above-described switching is two methods. One method changes the communication port 140 of the central communication device 110 that is the packet destination; and another method transmits packets by way of a communication port 140 other than the upstream port specified by the upstream port number storage unit 124 of the terminal communication device 120 without changing the communication port 140 of the central communication device 110 that is the packet destination. Here, in the first described method, the communication path control information is expressed by a "1", and in the next method the communication path control information is expressed by a "2", and when not either of these methods (when not set), the communication path control information is expressed as "0".

The central communication unit 111 transmits the communication path control information stored in the communication path control setting information storage unit 115 of the central communication device 110 to the terminal communication device 12 so that the communication path control information is stored into the communication path control method storage unit 127.

Figure 11:
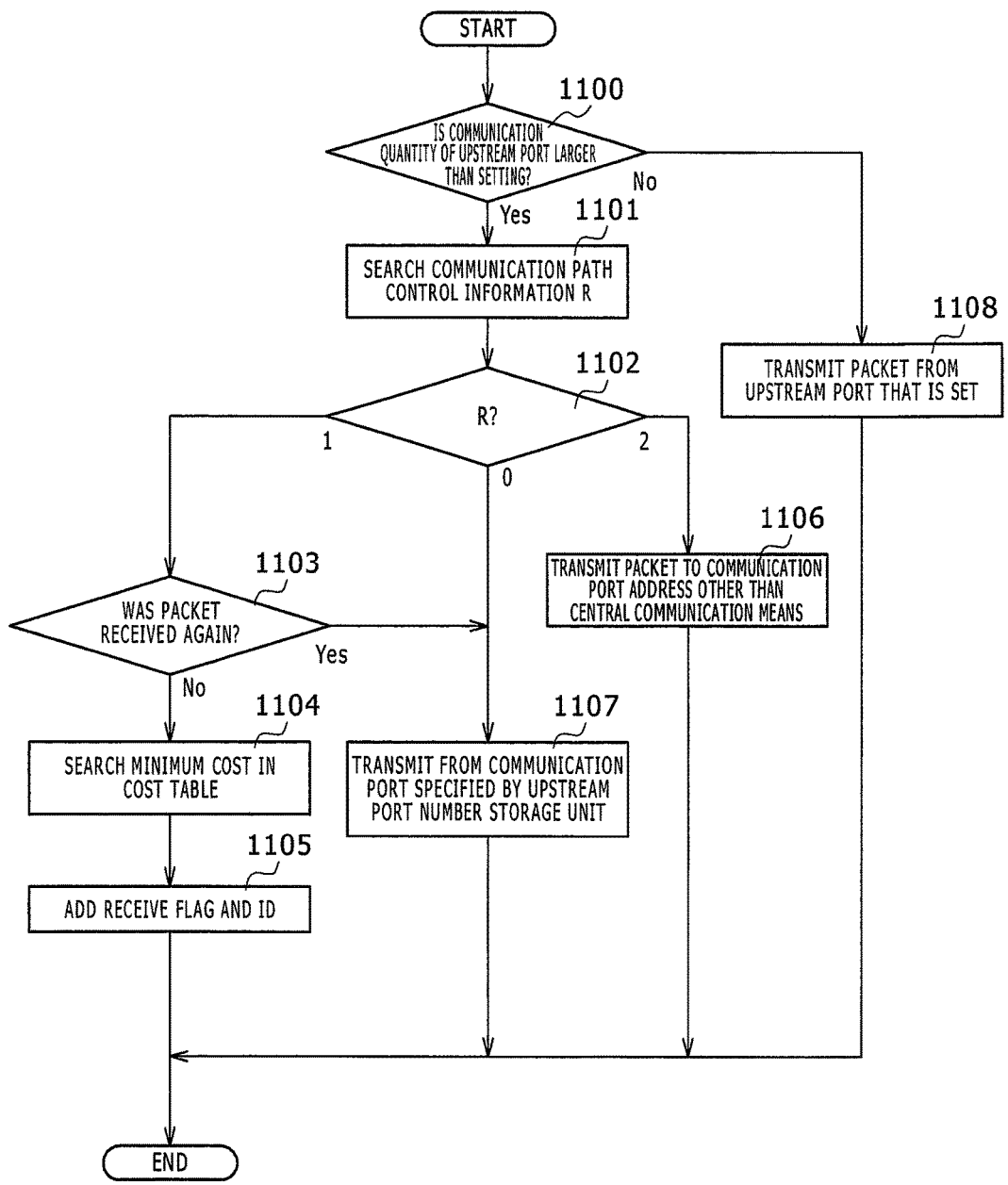
FIG. 11 is a flow chart showing the processing executed by the terminal communication control unit of the terminal communication device.

Next, FIG. 11 is a flow chart showing the processing executed by the terminal communication control unit 121 of the terminal communication device when changing the communication path in the motion controller shown in FIG. 1.

In the figure, first of all, the terminal communication device 120 confirms the communication quantity of the upstream port and then compares it with the communication quantity set in the communication data quantity storage unit 126 (process 1000).

When the result from process 1100 is that the value for the communication quantity of the upstream port is larger than the value of the communication quantity of the communication data quantity storage unit 126 ("Yes" in the figure), a search is made of the communication path control method (communication path information "R") set in the communication path control method storage unit 127 (process 1101).

Next, the communication path information "R" is judged (process 1102) and when the process result is that the information for the communication path control method ("R" of the communication path information) is "1", a check is made for packets that were received again (process 1103). If there are no re-received packets ("No" in the figure), a search is made for a minimum cost item (process 1104) from among the information stored among the terminal communication cost storage unit 125 (process 1104), and a receive flag and identification number (ID) are added to the packet (process 1105), the packet is transmitted and the processing ends.

However when the result of process 1102 is that the information for the communication control method is "2", the communication cost in the terminal communication cost storage unit 125 is minimal and a search is made of the terminal communication cost storage unit 125 for a communication port 140 of the central communication device 110 specified by the upstream port number storage unit as the communication destination, and the packet is transmitted to another communication port of the central communication device (transmits the central communication port number) (process 1106) and the processing ends.

Also, when the result for the process 1102 of the information for the communication control method is "0" or the result from the process 1103 is that the packet is received again ("Yes" in the figure), the packet is transmitted from the communication port 140 specified by the upstream port number storage unit (process 1107), and the processing ends.

Also when the result from process 1100 is that the communication quantity of the upstream port is smaller than the communication quantity of the communication data quantity storage unit 126 ("No" in the figure), the packet is transmitted from the upstream port that is set (process 1108) and the processing ends.

The above processing is capable of switching the communication path by way of the terminal communication device 120.

Figure 12:
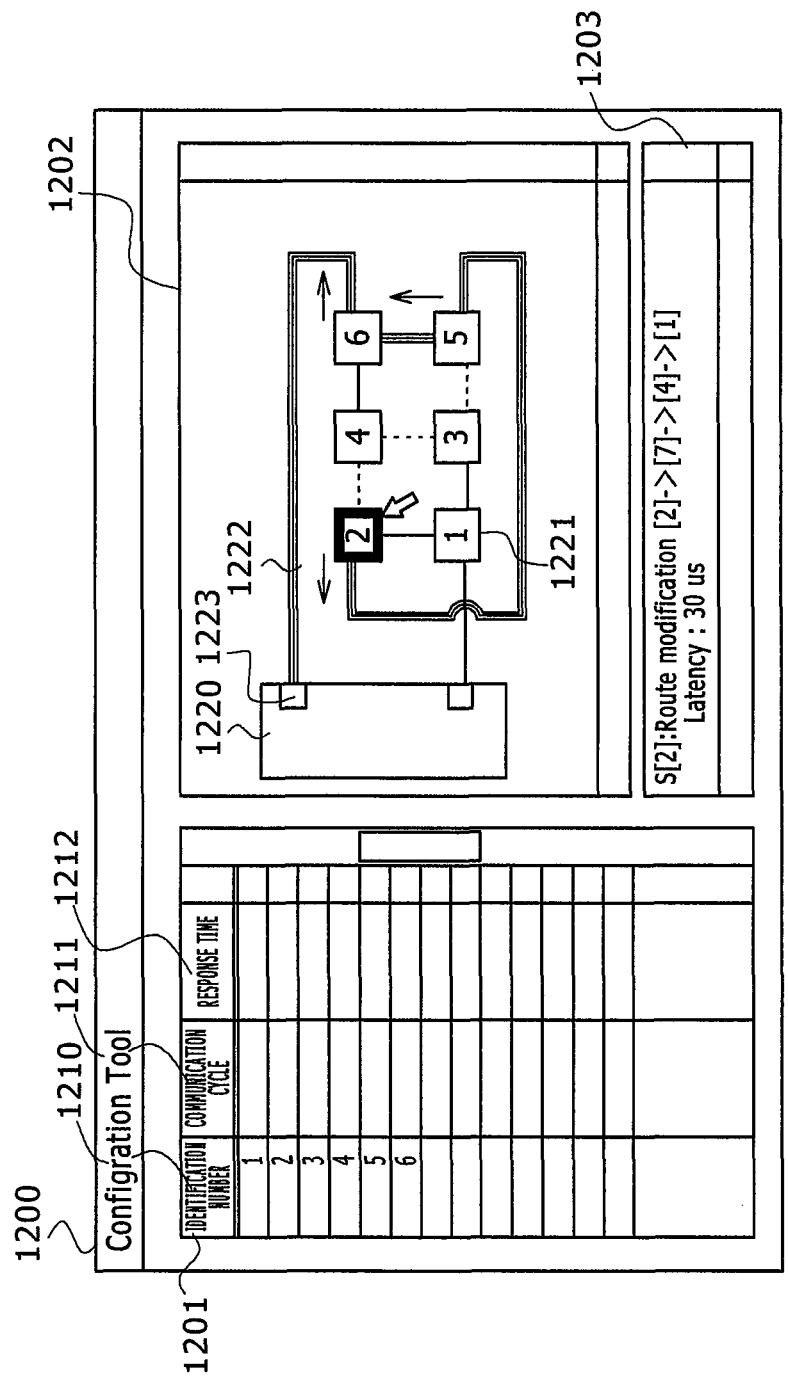
FIG. 12 is a drawing for describing the function and an example of the display of the control design support software in the embodiment of the present invention.

FIG. 12 shows one example of the display screen of the control support software 1200 rendered via a GUI (graphical user interface) that is used to confirm the switching of the communication paths of the network, and the setting of the request function for the device for control utilizing a display and input section 101 such as a monitor and keyboard by way of the control software execution unit 100 of central communication device 110.

As can be clearly understood from the drawing, the control support software 1200 is comprised of a communication function setter unit 1201, a network display unit 1202, a motion controller, and a process display unit 1203 that displays the processing contents of the control support software 1200.

The communication function setter unit 1201 is comprised of an identification number display unit 1210, a communication cycle setter unit 1211, and a communication response time setter unit 1212. The communication function setter unit 1201 displays an identification number set in each terminal communication device 120 on the identification number display unit 1210; sets a communication cycle requested by the terminal communication device 120 in the communication cycle setter unit 1211; and sets the response time for the communication requested to the terminal communication device 120 in the communication response time setter unit 1212.

The network display unit 1202 is comprised of a central communication unit symbol 1220, a terminal communication unit symbol 1221, a coupling state symbol 1222, and a communication port symbol 1223. These symbols are utilized to display the network structure of the motion controller, and the switching status of the communication paths, the communication data quantity of the each communication line, the communication error status and other information on the network display unit 1202. Further, details of the network operating status that are shown by the network display unit 1202 are shown on the process display unit 1203.

To sum up the main features of the present invention as described above, the motion controller is comprised of one or more terminal communication devices that execute input or output operation or control processing, and a central communication device coupled to the terminal communication devices by utilizing a network; and in which the central communication device further includes a control software execution unit to execute control commands to the devices for control and/or to set the communication control method; a control information storage unit to store control commands to the devices for control and/or the input and output information; an identification number storage unit to store an identification number for recognizing the individual terminal communication devices coupled to the network; a central communication control unit that executes communication control between the terminal communication devices over a network; one or more communication ports including one or more communication channels that convey a transmit signal and/or a receive signal by full duplex transmission in a communication signal of the network; a communication signal transmit and receive unit comprised of a pair of a communication signal receiver unit that executes receive-processing of communication signals of the network, and a communication signal transmitter unit that executes transmit-processing of communication signals of the network per communication port and that are equal in number to the communication channels of each communication port.

The terminal communication device of the present invention is preferably comprised of an identification number setter unit that sets the identification number; a device control unit that controls the device for control based on control commands that are sent from the central communication device by way of the network or performs operations for input and output information that is transmitted or received from the central communication device by way of the network; an upstream port number storage unit that specifies one of its own communication ports for transferring communication data when carrying out communications with the central communication device over a network; a terminal communication control unit that controls communication with the central communication device by way of the network; one or more communication ports; and one communication signal control unit in each communication port that includes two communication signal transmit and receive units and a transmit and receive switching control unit that switches the performing and stopping of transmitting and receiving of the communication signal transmit and receive units corresponding to one communication channel of the communication port.

The above structure is further preferably comprised of a transmission path between at least one communication port of the central communication device, and any one of the communication port of the terminal communication devices; and preferably comprised of a transmission path between at least one communication port of a terminal communication device, and any one of the communication port of the central communication device or any one of the communication port of the other terminal communication devices.

Another feature of the present invention in the structure is provided in which the terminal communication device determines the transmit operation and receive operation of the communication signal transmit and receive unit so as to switch the transmit operation and receive operation of the communication transmit and receive unit and correctly convey the full duplex communication signal on all the transmission paths by way of the transmit and receive signal switching control unit of the communication signal control unit.

Another feature in the above-described structure is a communication control method in which the central communication device transmits communication data including communication port numbers that are unique numbers set in each communication port by all of the central communication device's own communication ports; and the terminal communication device sets the communication port that initially receives the communication data transmitted from the central communication device as the upstream port among all of the terminal communication device's own ports, and stores the communication port number that is the individual port number set for that communication port and the communication port number contained in the communication data that is received at this time is stored into the upstream port number storage unit; and then the central communication device transmits communication data including the communication port number of the central communication device's own communication port where transmission of the communication data is performed and the identification number set in the terminal communication device to the terminal communication device by way of its own communication port; and the terminal communication device receives communication data from the central communication device by way of the upstream port specified by the upstream port number storage unit, and when the identification number of that communication data matches the identification number set in its own device, that communication data is loaded into its own device, and when the identification number of that communication data does not match the identification number set in its own device, the terminal communication device transmits that communication data from all other communication ports, and when a communication port number of the central communication device included in communication data received from other communication ports matches the communication port number of the central communication device stored in the upstream port number storage unit, the upstream communication port transmits the communication data, and when not a match, the terminal communication device discards that communication data, and when the terminal communication device transmits communication data from itself to the central communication device, the communication data including the communication port number of the central communication device stored in the upstream port number storage unit and the identification number set in the device itself is transmitted to the central communication device by way of the upstream port.

Moreover, as another feature of the present invention, the central communication device further includes: a central communication cost storage unit that stores a communication cost which is information expressing the delay time for communication that is required with the terminal communication devices coupled to a network; a communication path control setting information storage unit that stores communication path control information which is information expressing change methods when each terminal communication device is changing communication paths on a network; a communication status information storage unit that stores information regarding the communication status of each terminal communication device on the network; a communication path information storage unit that stores communication path information which is information expressing the network path to each terminal communication device; and a communication data quantity setting information storage unit that stores communication data quantity setting information which is information for setting the limit quantity of communication data on the communication lines set in the terminal communication devices. Moreover, the terminal communication device further includes: a communication data quantity storage unit that stores the limit quantity of communication data on the communication line coupled to the terminal communication device; and a communication path control information setting unit that sets communication path control information which is information expressing change methods when changing communication paths over a network.

Also in the above structure, the central communication device stores the communication path control information and the communication data quantity setting information to set into each terminal communication device, into the communication path control setting information storage unit and the communication data quantity setting information storage unit by way of the control software execution unit; and the central communication control device transmits the communication path control information that is stored in the communication path control setting information storage unit and communication data setting information stored in the communication data quantity setting information storage unit to the terminal communication device by way of the network; the terminal communication device stores the communication path control information that is transmitted from the central communication device into the communication path control information storage unit, and further stores the communication data quantity setting information that is transmitted from the central communication device into the communication data quantity storage unit; and the terminal communication device constantly monitors the communication data quantity of the upstream port that is specified from the upstream port number storage unit, and when the communication data quantity exceeds the value that is stored in the communication data quantity storage unit, the terminal communication device preferably executes any of the following communication control from the terminal communication control unit: transmit the communication data from one of its own ports other than the upstream port to a communication port of the central communication device other than the communication port of the central communication device specified by the upstream port, number storage unit; or transmit the communication data from a communication port other than the upstream communication port to a communication port of the central communication device specified by the upstream port number storage unit; or transmit the communication data from an upstream control port, based on the communication path control information that is stored in the communication path control information storage unit.

Further, the control software execution means of the central communication device may include a function to set the communication cycle that is required in the terminal communication device and the response time, generate communication path control information and communication data quantity setting information based on the communication cycle and response time that are set, and respectively store them in a communication path control setting information means and a communication data quantity setting information storage means of the central communication device. The control software execution means of the central communication device may also include a function to search the communication status information path storage means and the communication path information storage means of the central communication device, and provide the coupling structure, the communication path, and the communication status of the network. The control software execution unit of the central communication device preferably further includes a GUI (graphical user interface) to implement the setting function and a display function to display the network communication status that are included within the control software execution means.

Also in the above-described structure, there is no need to consider methods for coupling communication ports when configuring a network and the large number of man-hours required when configuring the controller can be reduced. Moreover, other structures allow easily configuring a complex network such as having plural communication paths without the necessity for considering methods for coupling communication ports when configuring the network. Further, another structure is capable of ensuring the response performance that is required for each device for control, by dynamically changing the communication paths in order to eliminate adjustment of the coupling structure, and reduce the man-hours that are required in the above-described complicated network.

LIST OF REFERENCE SIGNS

100 . . . Control software execution unit, 101 . . . Display and input means, 110 . . . Central communication device, 111 . . . Central communication control unit, 112 . . . Device control information storage unit, 113 . . . Identification number storage unit, 114 . . . Central communication cost storage unit, 115 . . . Communication path control setting information storage unit, 116 . . . Communication status information storage unit, 117 . . . Communication path information storage unit, 118 . . . Communication data quantity setting information storage unit, 120 . . . Terminal communication device, 121 . . . Terminal communication control unit, 122 . . . Identification number setter unit, 123 . . . Device control unit, 124 . . . Upstream port number storage unit, 125 . . . Terminal communication cost storage unit, 126 . . . Communication data quantity storage unit, 127 . . . Communication path control method storage unit, 130 . . . Communication signal control unit, 131 . . . Communication signal transmit and receive unit, 131-1 . . . Communication signal receiver unit, 131-2 . . . Communication signal transmitter unit, 133 . . . Transmit and receive switching unit 140 . . . Communication port, 150 . . . Communication line, 400 . . . Data section, 401 . . . Packet type section, 402 . . . Central communication port number section, 403 . . . Identification type number section, 1200 . . . Control support software, 1201 . . . Communication function setter unit, 1202 . . . Network display unit, 1203 . . . Process display unit, 1210 . . . Identification number display unit, 1211 . . . Communication cycle setter unit, 1212 . . . Communication response time setter unit, 1220 . . . Central communication means symbol, 1221 . . . Terminal communication unit symbol, 1222 . . . Coupling state symbol, 1223 . . . Communication port symbol

The invention claimed is:

1. A control system comprising:
a plurality of terminal communication devices connected to a plurality of control devices, each of the terminal communication devices having one or more first processors programmed to execute input and output operations and control processing of the control devices connected thereto, and two or more first communication ports; and
a central communication device coupled to the terminal communication devices by way of a network, and having one or more second processors and a plurality of second communication ports;
wherein a plurality of communication paths couple the central communication device and the terminal communication devices over the network, and each of the terminal communication devices is coupled to two or more communication paths including:
one or more first communication paths disposed between one or more of the second communication ports of the central communication device and the first communication ports of the terminal communication devices, and
one or more second communication paths disposed between the first communication ports of different ones of the terminal communication devices,
wherein each of the terminal communication devices is coupled to one or more of the first and second communication paths,
wherein the second processors of the central communication device are programmed to execute:
a control software execution unit that sends the control commands to the control devices and sets a plurality of communication control methods thereof;
a control information storage unit that stores a plurality of control commands for the control devices and stores input and output information thereof;
an identification number storage unit that stores a plurality of identification numbers for recognizing the individual terminal communication devices;
a central communication control unit that controls communications between the terminal communication devices and transmits and receives a plurality of communication signals with the terminal communication devices over a plurality of communication channels of the second communication ports by full duplex transmission; and
a plurality of communication signal transmit and receive units equal in number to the communication channels of the second communication ports, and that each include a pair of a communication signal receiver unit that performs receive processing of the communication signals for a respective communication channel and a communication signal transmitter units that performs transmit processing of the communication signals for the respective communication channel,
wherein the first processors in the terminal communication devices are each respectively programmed to execute:
an identification number setter unit that sets the respective identification number thereof;
a device control unit that controls the control device connected thereto based on the control commands sent from the central communication device via the network and communicates the input and output information to and from the central communication device via the network;
an upstream port number storage unit that specifies one of the first communication ports thereof that transfers the output information when carrying out communications with the central communication device by way of the network;
a terminal communication control unit that controls communication with the central communication device by way of the network; and
a plurality of communication signal control units equal in number to the first communication ports thereof, each of the communication signal control units including, for each of the communication channels, two communication signal transmit and receive units that execute receive processing and transmit processing of the communication signals as well as a transmit and receive switching control unit that switches performing of and/or stopping of transmitting and receiving operations of the communication signal transmit and receive units.

2. The control system according to claim 1, wherein
the second processors of the central communication device are further programmed to execute:
a central communication cost storage unit that stores a plurality of communication costs expressing a plurality of delay times for communications with the terminal communication devices via the network;
a communication path control setting information storage unit that stores communication path control information expressing a plurality of change methods when the respective terminal communication devices change communication paths on the network;
a communication status information storage unit that stores communication status information regarding the communication statuses of each of the terminal communication devices;
a communication path information storage unit that stores communication path information expressing the network paths to the respective terminal communication devices; and
a communication data quantity setting information storage unit that stores communication data quantity setting information for setting a plurality of limits quantities of communication data on the first communication paths coupled to the terminal communication devices, and
wherein the first processors in the terminal communication devices are each further programmed to execute:
a communication data quantity setting unit that stores the respective limit quantity of communication data on the communication paths coupled to the respective terminal communication device; and
a communication path control information setting unit that sets communication path control information expressing the respective change methods when changing the communication paths of the network.

3. The control system according to claim 1, wherein
the control software execution unit of the central communication device sets a communication cycle and a response time that are required in the terminal communication devices, generates communication path control information and communication data quantity setting information based on the set communication cycle and the response time, and stores communication path control information and communication data quantity setting information in the communication path control setting information unit and the communication data quantity setting information storage unit of the central communication device.

4. The control system according to claim 1, wherein
the control software execution unit of the central communication device searches the communication status information path storage unit and the communication path information storage unit of the central communication device, and provides a coupling structure, the communication paths, and the communication statuses of the network.

5. The control system according to claim 1, wherein
the second processors of the central communication device are further programmed to display a graphical user interface to display and set the communication cycle, response time and communication statuses.

6. The control system according to claim 1,
wherein the terminal communication devices each switch transmitting operations and receiving operations in the communication signal transmit and receive units thereof by way of a transmit and receive switching control unit of the communication signal control unit, and set the transmitting operations or receiving operations in the communication signal transmit and receive units so that full duplex communication signals are normally conveyed on all transmission paths of the communication paths,
wherein the central communication device sets and transmits a plurality of communication port numbers for the first communication ports which are different from a plurality of communication port numbers of the second communication ports,
wherein the terminal communication device sets one of the first communication ports that initially receives the communication signals transmitted from the central communication device as an upstream first communication port among all of the first communication ports thereof, and stores a communication port number of the upstream first communication port and the communication port numbers received from the central communication device in an upstream port number storage unit,
wherein the central communication device transmits the communication signals including one of the communication port numbers thereof and the respective identification numbers set in the terminal communication devices to the terminal communication devices by way of at least one of the second communication ports,
wherein each of the terminal communication devices receives the communication signals from the central communication device by way of the respective upstream first communication port specified by the upstream port number storage unit, and the terminal communication device internally loads the communication signals when the identification number of the communication signals matches the respective identification number thereof,
wherein each of the terminal communication devices, when the identification number of the communication signals does not match the respective identification number thereof, the communication signals are transmitted from any other of the first communication ports, and
wherein each of the terminal communication devices, when the second communication port number of the central communication device that is contained in the communication signals that is received from the other of the first communication ports matches the communication port number of the central communication device stored in the upstream port number storage unit, transmits the communication signals from the respective upstream first communication port thereof,
wherein each of the terminal communication devices, when the second communication port number of the central communication device that is contained in the communication signals that is received from the other of the first communication ports does not match the communication port number of the central communication device stored in the upstream port number storage unit, the communication signals are discarded, and wherein, when each of the terminal communication devices transmits the communication signals to the central communication device, the communication signals including the communication port number of the central communication device stored in the upstream port number storage unit and the respective identification number thereof are transmitted to the central communication device by way of the upstream first communication port.

7. The control system according to claim 6,
wherein the second processors of the central communication device are further programmed to execute:
a central communication cost storage unit that stores a plurality of communication costs expressing a plurality of delay times for communications with the terminal communication devices via the network;
a communication path control setting information storage unit that stores communication path control information expressing a plurality of change methods when the respective terminal communication devices change communication paths on the network;
a communication status information storage unit that stores communication status information regarding the communication statuses of each of the terminal communication devices;
a communication path information storage unit that stores communication path information expressing the network paths to the respective terminal communication devices; and
a communication data quantity setting information storage unit that stores communication data quantity setting information for setting a plurality of limits quantities of communication data on the first communication paths coupled to the terminal communication devices, and
wherein the first processors in the terminal communication devices are each further programmed to execute:
a communication data quantity setting unit that stores the respective limit quantity of communication data on the communication paths coupled to the respective terminal communication device; and
a communication path control information setting unit that sets communication path control information expressing the respective change methods when changing the communication paths of the network,
wherein the central communication device stores communication path control information and communication data quantity setting information that are set in each of the terminal communication devices into the communication path control setting information storage unit and the communication data quantity setting information storage unit by way of the control software execution unit,
wherein the central communication control unit transmits the communication path control information stored in the communication path control setting information storage unit and communication data setting information stored in the communication data quantity setting information storage unit to the terminal communication devices,
wherein each of the terminal communication devices stores the communication path control information that is transmitted from the central communication device into the communication path control information storage unit, and further stores the communication data quantity setting information that is transmitted from the central communication device into the communication data quantity storage unit, and
wherein each of the terminal communication devices monitors a communication data quantity of the upstream first communication port that is specified by the upstream port number storage unit, and, when the communication data quantity exceeds a predetermined value that is stored in the communication data quantity storage unit, executes communication control based on the communication path control information stored in the communication path control storage unit so that:
the communication signals are transmitted from one of the first communication ports thereof other than the upstream first communication port to the second communication ports of the central communication device other than the communication port of the central communication device specified by the upstream port number storage unit thereof, or
the communication signals are transmitted from one of the first communication ports thereof other than the upstream first communication port to the second communication port of the central communication device specified by the upstream port number storage unit thereof.

* * * * *